Figures 6, 7:
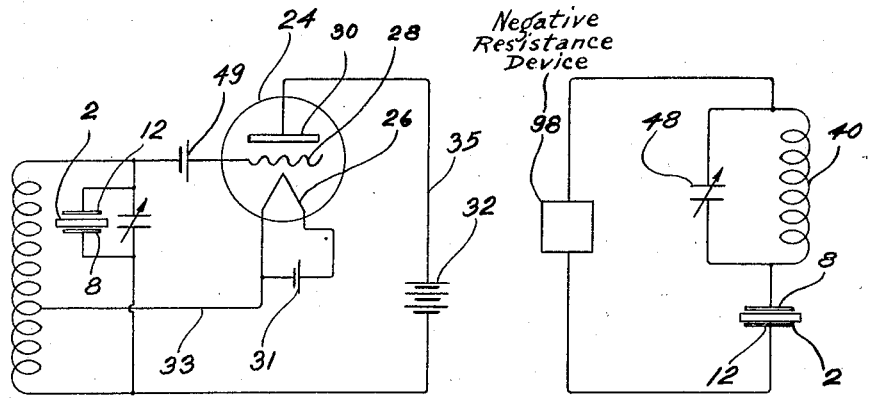

Dec. 17, 1929.    P. S. BAUER    1,740,146
ELECTRICAL METHOD
Filed May 27, 1926    2 Sheets-Sheet 1
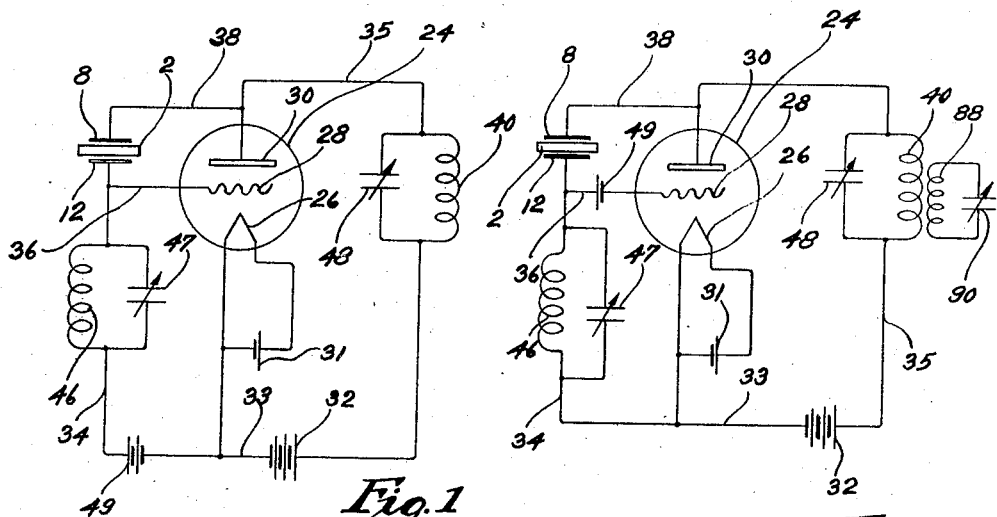
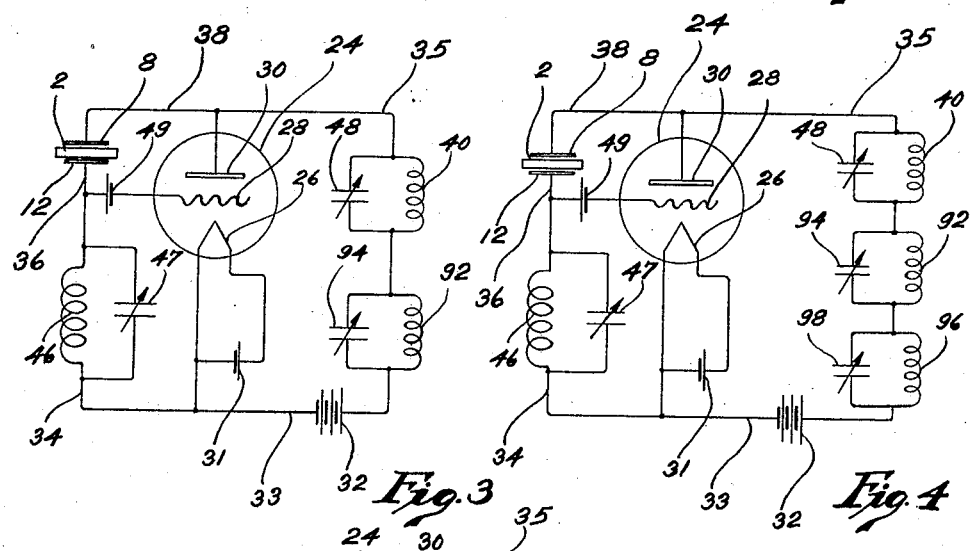
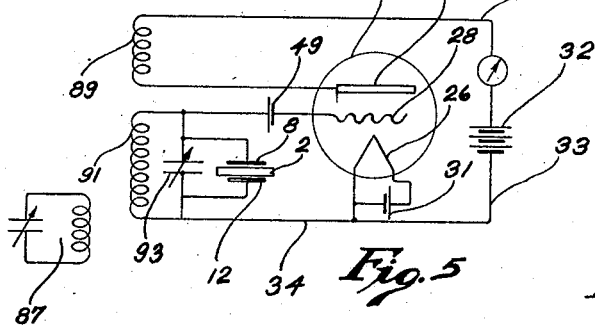
Inventor
Paul S. Bauer
By David Rines
Attorney Dec. 17, 1929.                P. S. BAUER                1,740,146
                           ELECTRICAL METHOD
                         Filed May 27, 1926           2 Sheets-Sheet 2

Inventor
Paul S. Bauer
By David Reno
Attorney

Patented Dec. 17, 1929

1,740,146

UNITED STATES PATENT OFFICE

PAUL S. BAUER, OF CAMBRIDGE, MASSACHUSETTS

ELECTRICAL METHOD

Application filed May 27, 1926. Serial No. 112,029.

The present invention relates to electrical methods, and more particularly to the control of alternating-current phenomena attendant upon the use of electro-mechanical vibrators having a plurality of modes of vibration, like piezo-electric bodies.

At a frequency in the neighborhood of a free, natural or resonant frequency of a normal mode of mechanical vibration of a piezo-electric crystal body, the current flowing in the alternating-current system sets the crystal into violent mechanical vibration; and the vibrating crystal develops an electromotive force that, in turn, reacts upon the current flowing in the system. As the frequency of the current in the alternating-current system approaches a natural, free period of mechanical vibration of the crystal, the current first becomes increased to a maximum at a frequency slightly below the resonant frequency, followed by a minimum at a frequency slightly above the resonant frequency; and, in the case of oscillating circuits, the frequency of the oscillations is stabilized, or rendered very nearly constant.

The normal modes of mechanical vibration of the crystal body corresponding to which the frequency of the alternating-current circuit may be controlled have hitherto been regarded as very few in number. Prior investigators have, for example, recognized the existence of the so-called, longitudinal and transverse modes of vibration. As a matter of fact, however, a piezo-electric crystal never vibrates in one direction only, such as the longitudinal or the transverse. It vibrates along all three of its dimensions at once. When a body is said to vibrate according to its longitudinal mode of vibration, what is meant is that the component in the longitudinal direction is so dominant that the vibrations in the two directions at right angles thereto are negligible in comparison. Theoretically, the crystal may have an unlimited or very large number of different normal modes of mechanical vibration, each corresponding to a different frequency. These additional normal modes of mechanical vibration will, for definiteness, be referred to in the specification and the claims, as subsidiary modes of mechanical vibration, to distinguish them easily from the dominant modes. In practice, investigators have been unable to cause the crystals to control the alternating-current circuit at any but the small number of dominant frequencies, the vibrations of the crystal at the said dominant frequencies drowning out the effects of the vibrations of the crystal at the subsidiary frequencies. This has greatly limited the use of the crystals to a very small number of frequencies. To obtain varying frequencies, it has been found necessary to use different crystals, and to provide mechanism adapted to the ready interchange of one crystal for another in circuit.

A chief object of the invention is to utilize the subsidiary modes of mechanical vibration of electro-mechanical vibrators of the above-described character.

A further object is to cause the electrical system to oscillate with electrical fundamental frequencies corresponding to the frequencies of subsidiary normal modes of mechanical vibration of the electro-mechanical vibrator.

Another object is to obtain a large number of frequencies with the use of the same vibrator, obviating the necessity of interchanging one vibrator for another in the circuit.

Still another object is to obtain a large number of frequencies in the neighborhood of a resonant frequency.

Other and further objects will be explained hereinafter and will be particularly pointed out in the appended claims.

With the above and other ends in view, the invention consists of the improved method a preferred embodiment of which is hereinafter described, illustrated in the accompanying drawings and defined in the appended claims; it being understood that it is intended to cover the appended claims all the novelty that the invention may possess.

For convenience, the displacements of the crystal, resulting in mechanical vibration, will be termed "stimulation"; and the development by the vibrating crystal of the electromotive forces that react upon the current will be termed "response."

In the accompanying drawings, Fig. 1 is a diagram of circuits and apparatus illustrating an operable embodiment of the invention; and Figs. 2 to 9 are similar diagrams of modifications.

In a copending application, Serial No. 695,094, filed February 25, 1924, by Professor George W. Pierce, there is disclosed an electrical system comprising an electrical circuit that is not, in itself, oscillatory, in combination with a piezo-electric body, the connections being such that the resulting system oscillates at a frequency substantially equal to the frequency of one of the normal modes of mechanical vibration of the piezo-electric body. It will be convenient to describe the invention in connection with a system involving the Pierce oscillator, as it is now known in the art, though it will, of course, be understood that the invention is by no means limited to use in such a system.

Referring to Fig. 1, a vacuum tube 24 is diagrammatically shown provided with three electrodes, namely, a filament 26, a grid 28 and a plate 30. The filament-heating battery is shown at 31. The output circuit comprises a plate battery 32, connected with the filament 26 by a conductor 33, and with the plate 30 by a conductor 35, and including a load, shown in the form of an inductance coil 40, having a distributed capacity and resistance. A condenser 48 may be connected in circuit with the load 40 for the purpose of varying the reactance of the plate circuit. The input circuit comprises an impedance 46, 47 joined to the grid and the filament by a conductor 34, and including a biasing battery 49 for giving the grid a suitable potential about which its fluctuations occur.

The electro-mechanical vibrator 2 is provided with two electrodes 8 and 12. The electrode 12 of the electro-mechanical vibrator 2 is connected by a conductor 36 with the grid, and the other electrode 8 by a conductor 38 with the plate 30. The system will oscillate readily with a frequency determined by the fundamental frequency of some dominant normal mode of mechanical vibration of the electro-mechanical vibrator, and independent of the nature of the load 40.

Using particular values of the reactance of the elements 40, 48, 46 and 47, the circuit of Fig. 1 will oscillate at a frequency corresponding to one of the dominant normal modes of mechanical vibration. What these particular values should be has been explained in a co-pending application, Serial No. 105,451, filed April 29, 1926, but it is unnecessary, for present purposes, to know the exact values of these reactances, it being sufficient to know that there are values for which the circuit will oscillate at this dominant mode of vibration.

But the circuit will also oscillate, according to the present invention, for values of the reactances corresponding to subsidiary modes of mechanical vibration of the crystal. A simple example will first be given, and then the invention will be explained at greater length.

If the circuit is prevented from oscillating in the neighborhood of the said exact values of the reactances corresponding to a dominant normal mode of mechanical vibration, and if the said reactances are then carefully and very gradually varied, the circuit will be found to oscillate at other values of the reactances very close to the before-mentioned values. The crystal will then be found to vibrate according to one of its subsidiary modes of vibration. There is so great a tendency for the dominant mode of vibration to take the upper hand that very careful manipulation is necessary. Close to each dominant mode of mechanical vibration of the crystal, there will be found to exist a number of subsidiary modes of vibration, each with a frequency differing from the frequency corresponding to the dominant mode of vibration, and the subsidiary frequencies differing from each other. For example, the numerical values of the wave lengths of normal modes of mechanical vibration of two crystals, in meters, corresponding to two dominant and subsidiary frequencies, were found experimentally to be as follows:

| Crystal | Dominant | Subsidiary |
|---|---|---|
| 1 | 265.38 | 254.91 |
| 2 | 262.71 | 222.33 |

It may be well to make the explanation of the phenomenon a little more complete by a brief reference to the theory. It will be understood, however, that a knowledge of the theory is not essential to the practical operation and that the utility of the present invention is not dependent upon the existence of theories, whether accurate or inaccurate, to account for the observed phenomena.

The above-mentioned application, Serial No. 105,451, contains a mathematical demonstration of the fact that the electrical system of the Pierce design will oscillate (assuming proper values of the reactances) under two conditions only:—First, when the equivalent series reactances in the plate-load circuit and in the connection between the crystal and the filament are both inductive; and secondly, when they are both capacitive. Assuming, now, that either of these conditions is satisfied, and the circuit of Fig. 1 is, therefore, oscillating at a frequency corresponding to a dominant normal mode of mechanical vibration, all that is necessary to stop the oscillations is to adjust carefully the reactances 40, 46, 47 and 48, or any one or more of them until this condition for oscillation is no longer satisfied; that is, until one of the above equivalent series reactances is barely positive at a time when the other remains negative, or vice versa. The condenser 48 may, for example, be adjusted until the reactance 40, 48 is just positive, while the reactance 46, 47 remain negative. Further careful and gradual adjustment in the same direction will increase the positive character of the said one reactance 40, 48 (or the negative character, if the adjustment has caused a change from positive to negative, instead of from negative to positive). But a reactance that is inductive at one frequency may be capacitive at another frequency. The said further careful and gradual adjustment in the same direction will, therefore, make the said one positive reactance 40, 48 negative at a different frequency; that is, assuming that the other reactance has remained negative at this different frequency, the conditions for oscillation may be restored, but at this different frequency. When this different frequency approximates the frequency of a subsidiary normal mode of mechanical vibration of the crystal, therefore, the circuit will again be set into oscillation but, this time, at a frequency approximating the subsidiary frequency.

This explanation of how to obtain oscillations at subsidiary frequencies in the system of Fig. 1 has thus been given at considerable length because it is not easy, in practice, to produce subsidiary oscillations and because a careful carrying out of the above directions will almost certainly yield the desired result, even in inexperienced hands. But it should be understood that subsidiary frequencies are obtainable, not merely in the neighborhood of frequencies corresponding to dominant normal modes of mechanical vibration, but throughout very wide ranges of wave lengths. In the above-mentioned application, Serial No. 105,451, a complete explanation is given of frequencies corresponding to dynamical overtones of the vibrator; but other widely scattered frequencies than those corresponding to the overtones are also obtainable. For example, the following wave lengths, in meters, were obtained, using the same crystal throughout:

| | | | | | | |
|---|---|---|---|---|---|---|
| 889.1 | 262.53 | 156.15 | 141.15 | 120.60 | 110.25 | 104.70 |
| | | 155.94 | 140.41 | 114.30 | 107.63 | 103.30 |
| | | 154.52 | 131.53 | 113.85 | 106.45 | 99.75 |
| | | 153.10 | 124.29 | 112.95 | 106.00 | 91.28 |
| | | 143.73 | 123.12 | 112.80 | 105.30 | 88.38 |

The range of wave lengths reproduced here is from 88.38 to 889.1. It could have been increased at both ends, and a number of additional intermediate modes of vibration could also have been obtained.

To obtain all the subsidiary frequencies is not always easy; but they can be obtained by suitable adjustments of the reactances of the circuit, as before explained. The circuit will not always commence oscillating noticeably as soon as the reactance adjustments have been made, for it frequently takes considerable time for the oscillations to build up to a value such that they can be detected. The time necessary is often a matter of minutes. If, however, the subsidiary modes of vibration of the crystal are known beforehand,—and they can be determined,—then corresponding oscillations can always be obtained by suitably adjusting the reactances and awaiting developments. The analysis given in the above-referred-to application, Serial No. 105,451, applies also to the subsidiary vibrations, but the analysis is not here necessary because careful practical manipulation will give the results without any knowledge of the theory.

As a practical application of this method, assuming that radio signals are being transmitted at a given frequency, and there is interference at this frequency, the interference can readily be eliminated by merely changing to one of the subsidiary modes of vibration of the crystal, as above described, and without the necessity of using a different crystal.

In the above description, the circuit was assumed first to be oscillating at a dominant frequency, and directions were given for then obtaining subsidiary oscillations in the neighborhood of the dominant frequency. The circuit arrangements shown in Fig. 2 illustrate one method of attaining such neighboring subsidiary oscillations without interference from the dominant oscillations. The coil 40 is coupled very closely to a coil 88 that is shunted by a tuning condenser 90. It is possible to adjust the winding 88 and the condenser 90 to values such that the resulting load placed on the alternating-current circuit is so large that the crystal will not react upon the current at a frequency corresponding to a dominant normal mode of mechanical vibration of the crystal. The circuit will thus be prevented from oscillating at this frequency. To obtain the desired subsidiary frequency, all that is necessary is to adjust carefully, as before.

A similar result may, of course, be obtained by inserting an anti-resonant circuit at the dominant frequency, like a coil 92 and a condenser 94 shunted thereby, into the plate circuit itself, as illustrated in Fig. 3. The power is thus absorbed in the same manner as described in connection with Fig. 2. Though the coils 40 and 92 may not be inductively coupled together, the anti-resonant circuits 40, 48 and 92, 94 are nevertheless coupled. In fact, as illustrated in Fig. 4, one or more additional coils 96 and condensers 98 may be inserted into the plate circuit, one coil and condenser to prevent the circuit oscillating at the frequency corresponding, say, to the longitudinal mode of vibration of the crystal, another coil and condenser to stop the oscillations corresponding to the transverse mode, and so on. The coil and condenser 40, 48, may then be used to get any other mode of vibration.

Though the above explanations have been made with reference to Figs. 1 and 2, illustrating a Pierce-oscillator system, in order to fix the ideas, it will be understood that the invention is by no means so limited, as will be also understood by reference to the above-designated application Serial No. 105,451. The crystal may, for example, be connected in the plate circuit, instead; or between the filament and the grid. The invention is also applicable to the stabilization of circuits that are already oscillatory without the aid of the crystal as will now be explained by reference to Fig. 5, which illustrates diagrammatically a well known Armstrong feed-back circuit.

In this figure, the same reference numerals are used to designate the parts, the inductively coupled coils of the circuit being indicated at 89 and 91, the former in the output circuit and the latter in the input circuit. The crystal 2 is connected in parallel across the condenser 93, that is disposed in parallel relation to the coil 91. Adjustment of the condenser 93 in one direction or the other will cause the frequency of the oscillations to vary, as is well known. When the frequency of the oscillations is close to the frequency of a subsidiary normal mode of mechanical vibration of the crystal, the crystal will take over the control of the oscillations, and the frequency will be maintained substantially constant, and substantially equal to the subsidiary frequency, over a wide range of adjustment of the parameters of the system, like the condenser 93, the battery 32, and so on. When the adjustment is sufficiently far away from the subsidiary frequency, and only then, the oscillations will escape from the control of the crystal.

The present invention therefore provides a means of stabilizing an oscillating circuit at practically any desired frequency, and using a single circuit; for all that is necessary is to adjust the oscillations to a value in the neighborhood of a frequency that is substantially the same as a predetermined subsidiary frequency of the crystal, and the crystal will then immediately stabilize the oscillations at the desired subsidiary frequency. In fact, the above-listed wave lengths were obtained in this manner.

Of course, the systems of Figs. 1 to 4 may operate either according to the Pierce system or the Armstrong system. In the latter case, the coupling between the plate and grid circuits may be through the tickler coils or the capacity of the tube, the crystal acting as a stabilizer.

Similar action obtains when other than Armstrong regenerative circuits are used as, for example, the Hartley circuit shown in Fig. 6.

A similar circuit is shown in Fig. 7, involving the use of a negative-resistance device 98, such as a two-electrode gas tube, an arc, or the like. The same principles apply.

With the system of Fig. 5, it is necessary to use an external wave meter to determine an approximate value of the frequency of the oscillating circuit. Such an external measuring apparatus is diagrammatically shown in Fig. 5 at 87. The approximate value of the frequency thus determined, we shall know that the frequency will be stabilized by the crystal. It is necessary to recalibrate the circuit at every different operation.

Figures 8, 9:
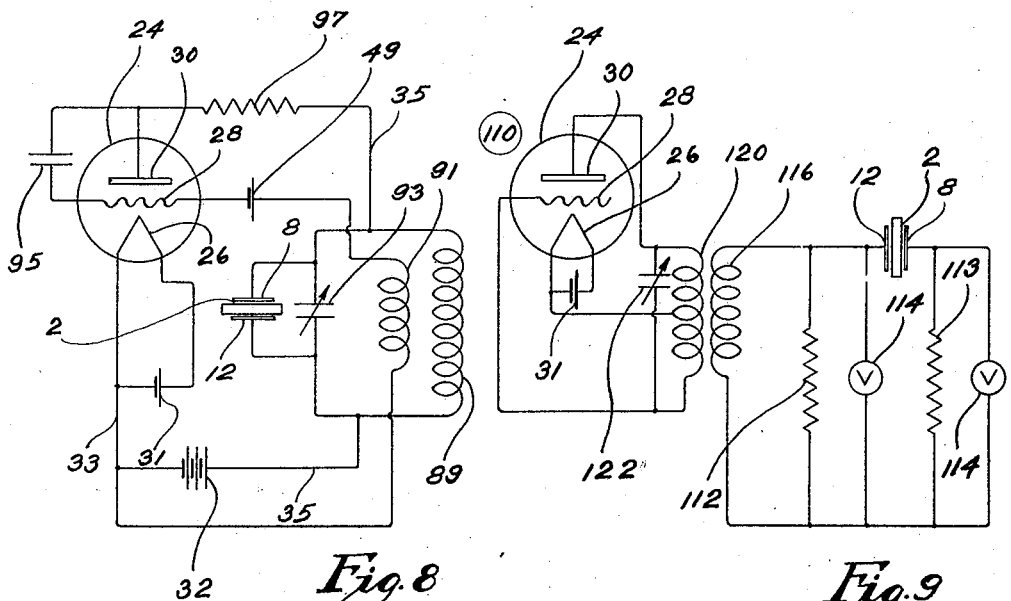

A circuit that does not require the use of an additional wave meter is shown in Fig. 8. The coil 91 in the filament-grid circuit is here shown coupled to the coil 89 in the plate circuit. The condenser 93 is, however, connected in parallel with the coil 89. The oscillatory element 89, 93 is thus in the plate circuit, which yields greater power and stability, as is well known. A resistor 97 is inserted in the plate circuit to increase the stability irrespective of the strength or weakness of the plate battery. A condenser 95 is connected between the grid and the plate for a similar purpose. With this arrangement, the circuit may once be calibrated for a large number of frequencies, and any particular position of the dial will always give a particular approximate frequency. The crystal will stabilize at a frequency corresponding to each of its modes of vibration. All that is necessary, in this arrangement, is to adjust the dial to the approximate desired frequency, and to insert the crystal into circuit whereupon the system will oscillate at the desired stabilized frequency. The system may, therefore, be used as a source of standard frequencies over a wide range of values with a single crystal.

The invention is by no means limited to use in oscillating circuits. It is equally applicable, for example, to resonating circuits, as will be understood by reference to Fig. 9, which comprises a source of alternating voltage of variable frequency, illustrated diagrammatically as a vacuum-tube oscillator 110, that transfers energy to the resonating circuit through coupled coils 120 and 116. The resonating circuit comprises two resistors 112 and 113 in parallel with the coil 116. The crystal 2 is disposed between the resistors, as shown. Vacuum-tube voltmeters 114, connected across the resistors, measure the voltage drop thereof. By adjusting a condenser 122 that is disposed in parallel with the coil 120, in the same manner as heretofore described, to a subsidiary frequency of the crystal, the crystal will offer a large impedance to the current at such subsidiary frequency, and the voltage drop across the resistor 113 will decrease to a very small value.

According to some features of the invention, the frequency may be made to jump from one dominant mode of vibration to another, as from the longitudinal to the transverse. The system of Fig. 4, for example, is particularly adapted to such operation. In Fig. 4, the longitudinal or the transverse vibrations may be obtained at will, be merely adjusting the proper condenser 94 or 98 so as to prevent oscillation at one frequency and to permit it at another. In Fig. 2, the condenser 90 may be so designed that its adjustment may be over quite a large range of frequencies.

It is believed to be unnecessary to explain to men skilled in the art how to design these circuits. In general, a large ratio of the inductance to the capacity of the parallel plate circuit will permit of greater variation in the condenser 48 than a small ratio, without stopping the oscillations. This ratio should therefore be large, or the decrement small, in Fig. 1. It should, on the other hand, be small, or the decrement high, in an absorbing circuit, as in Figs. 2 and 3. In Fig. 3, for example, the condenser 94 may be adjusted so as to absorb as little power as possible; the condenser 48 would then be adjusted to obtain the conditions for oscillation.

It has heretofore been considered that the resonant frequency corresponding to a normal mode of mechanical vibration of the crystal has a unique value. Referring to curves I and $i$, Fig. 6, of a paper by Professor Cady, Proceedings of the Institute of Radio Engineers, April, 1922, page 101, for example, the frequency corresponding to the normal mode of mechanical vibration of the crystal has been regarded as fixed, and as having a value corresponding to the very lowermost portions of these curves. In fact, it is the fixity of these unique values that has been regarded as one of the most important features connected with the use of piezo-electric crystals. It is sometimes desirable to control the circuit oscillations at a value a little different from such unique values; and according to a further feature of the present invention, it is possible to obtain any one of a large number of frequencies in the neighborhood of the unique value, all very close together.

As an example, a crystal having a first overtone wave length of 88.437 meters (the fundamental being 262.1), produced oscillations having wave lengths as follows:

88.437   88.447
88.421   88.429
88.431   88.409

The desired result may be obtained in many ways, one of which may be explained in connection with Fig. 3. Assuming that the reactance 92, 94 is adjusted to give oscillations of the desired normal mode of vibration, a very careful and gradual adjustment of the condenser 94 will break up the conditions for oscillation at the lowermost point of the curves I or $i$, above-mentioned, and a slight adjustment of the condenser 48 will then cause oscillation at some other point of these curves. Or, the two condensers 48 and 94 may be adjusted together so as to obtain a slightly different frequency of oscillation without disturbing the vibrations of the crystal. The method is substantially the same as that heretofore described, except that any point on the resonating curve may here be obtained, while the prior description was concerned with getting the lowermost points of any one of a number of different curves. The method is, of course, applicable to subsidiary as well as dominant frequencies, so that it is possible, according to the present invention, to obtain not merely the subsidiary frequencies, but also a large number of frequencies, very close together, on each side of each subsidiary and dominant frequency.

It will be understood that the invention is not restricted to the exact embodiments thereof that are illustrated and described herein, as other modifications will readily occur to persons skilled in the art and all such are considered to fall within the spirit and scope of the invention as defined in the appended claims.

What is claimed is:

1. A method of producing subsidiary oscillations in an alternating-current system comprising a piezo-electric body, the said system being adapted to oscillate at a frequency corresponding to a dominant normal mode of mechanical vibration of the body, the mechanical vibrations of the body corresponding to the said dominant normal mode being so powerful as to have a tendency to drown out the mechanical vibrations of the body corresponding to the subsidiary normal mode of mechanical vibration of the body, the said method comprising adjusting the reactance of the system to a value such that the system shall oscillate at a subsidiary normal mode of mechanical vibration of the body.

2. A method of operating an electro-mechanical system comprising a vacuum tube having three electrodes, namely, a filament, a grid and a plate, and an electro-mechanical vibrator connected with two of the electrodes, the said method comprising adjusting the reactance of the system to a value such that the system shall oscillate at a frequency subsidiary to the frequency determined by a dominating normal mode of mechanical vibration of the electro-mechanical vibrator, the mechanical vibrations of the vibrator corresponding to the said dominant normal mode being so powerful as to have a tendency to drown out the mechanical vibrations of the vibrator corresponding to the subsidiary normal modes of mechanical vibration of the vibrator.

3. A method that comprises reacting upon the current of an alternating-current system with an electro-mechanical vibrator adapted to vibrate mechanically in a steady persistent state when stimulated electrically and to respond electrically in a steady persistent state when vibrated mechanically, the vibrator being so designed that the frequency of a normal mode of mechanical vibration of the vibrator shall be substantially equal to the frequency of the current, the said frequency being subsidiary to a frequency corresponding to a dominant normal mode of mechanical vibration of the vibrator, the mechanical vibrations of the vibrator corresponding to the said dominant normal mode being so powerful as to have a tendency to drown out the mechanical vibrations of the vibrator corresponding to the subsidiary normal modes of mechanical vibration of the vibrator.

4. A method that comprises reacting upon the current of an alternating-current circuit with an electro-mechanical vibrator adapted to respond electrically in a steady state when vibrated mechanically, the vibrator being so designed that the frequency of a normal mode of mechanical vibration of the vibrator shall be substantially equal to the frequency of the current, the said frequency being subsidiary to a frequency corresponding to a dominant normal mode of mechanical vibration of the body, the mechanical vibrations of the vibrator corresponding to the said dominant normal mode being so powerful as to have a tendency to drown out the mechanical vibrations of the vibrator corresponding to the subsidiary normal mode of mechanical vibration of the vibrator.

5. A method that comprises reacting in a persistent steady state upon the current of an alternating-current circuit with a piezo-electric body that is so designed that the natural frequency of a normal mode of mechanical vibration of the body shall be substantially equal to the frequency of the current, the said frequency being subsidiary to a frequency corresponding to a dominant normal mode of mechanical vibration of the crystal, the mechanical vibrations of the body corresponding to the said dominant normal mode being so powerful as to have a tendency to drown out the mechanical vibrations of the body corresponding to the subsidiary normal modes of mechanical vibration of the body.

6. A method of operating an oscillating system comprising a source of electric energy that comprises reacting upon the current of the source with a piezo-electric body designed to react electrically upon the source in a stable persistent manner at a frequency of the oscillations of the system corresponding to the frequency of a normal mode of mechanical vibration of the body, the said frequency being subsidiary to a frequency corresponding to a dominant normal mode of mechanical vibration of the body, the mechanical vibrations of the body corresponding to the said dominant normal mode being so powerful as to have a tendency to drown out the mechanical vibrations of the body corresponding to the subsidiary normal modes of mechanical vibration of the body.

7. A method of operating an alternating-current system comprising two circuits and a piezo-electric body connected with one of the circuits, the said method comprising transmitting energy from the said one circuit to the other circuit at a frequency corresponding to the frequency of a normal mode of mechanical vibration of the body, the said frequency being subsidiary to a frequency corresponding to a dominant normal mode of mechanical vibration of the body, the mechanical vibrations of the body corresponding to the said dominant normal mode being so powerful as to have a tendency to drown out the mechanical vibrations of the body corresponding to the subsidiary normal modes of mechanical vibration of the body.

8. A method of operating an oscillator comprising piezo-electric means vibrating under control of output energy from said oscillator, the said method comprising transferring energy from the output to the input of the oscillator at a frequency corresponding to a normal mode of mechanical vibration of the piezo-electric means, the said frequency being subsidiary to a frequency corresponding to a dominant normal mode of mechanical vibration of the piezo-electric means, the mechanical vibrations of the piezo-electric means corresponding to the said dominant normal mode being so powerful as to have a tendency to drown out the mechanical vibrations of the piezo-electric means corresponding to the subsidiary normal mode of mechanical vibration of the piezo-electric means.

9. A method of producing oscillations that comprises stimulating with electrical energy from a negative-resistance device an electro-mechanical vibrator that is adapted to vibrate mechanically when stimulated electrically and to respond electrically when vibrated mechanically, and utilizing the electrical response of the vibrator to react upon the device at a frequency corresponding to a natural frequency of mechanical vibration of the vibrator, the said frequency being subsidiary to a frequency corresponding to a dominant normal mode of mechanical vibration of the vibrator, the mechanical vibrations of the vibrator corresponding to the said dominant normal mode being so powerful as to have a tendency to drown out the mechanical vibrations of the vibrator corresponding to the subsidiary normal mode of mechanical vibration of the vibrator.

10. A method of producing subsidiary oscillations in an oscillating system comprising a space-current device and a piezo-electric body, the said method comprising adjusting the reactance of the system to a value such that the system shall produce oscillations of a frequency corresponding to the frequency of a normal mode of mechanical vibration of the piezo-electric body, the said frequency being subsidiary to a frequency corresponding to a dominant normal mode of mechanical vibration of the body, the mechanical vibrations of the body corresponding to the said dominant normal mode being so powerful as to have a tendency to drown out the mechanical vibrations of the body corresponding to the subsidiary normal modes of mechanical vibration of the body.

In testimony whereof, I have hereunto subscribed my name.

PAUL S. BAUER.